No. 772,042. PATENTED OCT. 11, 1904.
F. W. HUDSON.
MOLDING MACHINE.
APPLICATION FILED MAR. 5, 1901. RENEWED FEB. 10, 1903.
NO MODEL. 4 SHEETS—SHEET 1.

Witnesses:
Watson Hurlburt
Paul Carpenter

Inventor:
Frank W. Hudson
By Paul Synnestvedt Atty.

No. 772,042. PATENTED OCT. 11, 1904.
F. W. HUDSON.
MOLDING MACHINE.
APPLICATION FILED MAR. 5, 1901. RENEWED FEB. 10, 1903.
NO MODEL. 4 SHEETS—SHEET 3.

Witnesses:
Wilson Hurlburt
Paul Carpenter

Inventor:
Frank W. Hudson
By Paul Synnestvedt Atty.

No. 772,042. PATENTED OCT. 11, 1904.
F. W. HUDSON.
MOLDING MACHINE.
APPLICATION FILED MAR. 5, 1901. RENEWED FEB. 10, 1903.
NO MODEL. 4 SHEETS—SHEET 4.

Witnesses:
Watson Hurlburt
Paul Carpenter

Inventor:
Frank W. Hudson
By Paul Synnestvedt Atty.

No. 772,042.

Patented October 11, 1904.

UNITED STATES PATENT OFFICE.

FRANK W. HUDSON, OF CHICAGO, ILLINOIS, ASSIGNOR, BY MESNE ASSIGNMENTS, TO AMERICAN BRAKE SHOE & FOUNDRY COMPANY, OF NEW YORK, N. Y., A CORPORATION OF NEW JERSEY.

MOLDING-MACHINE.

SPECIFICATION forming part of Letters Patent No. 772,042, dated October 11, 1904.

Application filed March 5, 1901. Renewed February 10, 1903. Serial No. 142,807. (No model.)

*To all whom it may concern:*

Be it known that I, FRANK W. HUDSON, a citizen of the United States, residing in Chicago, Cook county, Illinois, have invented certain new and useful Improvements in Molding-Machines, of which the following, taken in connection with the accompanying drawings, is a specification.

My invention relates to that class of molding machines in which the separation of the pattern from the mold is effected with the assistance of some form of power or fluid pressure rapping device, generally pneumatic, put into operation by some valve mechanism at the time that the separation or stripping of the pattern takes place.

Heretofore it has been proposed to employ power rapping devices in connection with machines upon which the pattern was attached to a pattern-plate and the rapper secured upon some projection extending out from said pattern-plate, and also in connection with machines having the pattern secured to a kind of open framework, the rapping device being attached or operating against a projection of said frame extending outside of the flask.

In the use of all of the above described devices, a change of pattern involves considerable expense, and the machines themselves, some of them at least, are quite complicated.

My invention has for its object the provision of a mechanism in which power or fluid pressure rapping can be employed to assist in separating the mold from the pattern, and in which, at the same time, the mold can be lowered away from the pattern so that the mold will not be so liable to be broken or injured, and in which a change of patterns can be effected with a minimum of expense and with great facility.

In carrying out my invention I have embodied it in a machine which I have illustrated in preferred form in the accompanying drawings, in which Figure 1 shows my machine in perspective with the flask in what I shall for convenience hereinafter term, "up-right" position;

Figure 1:
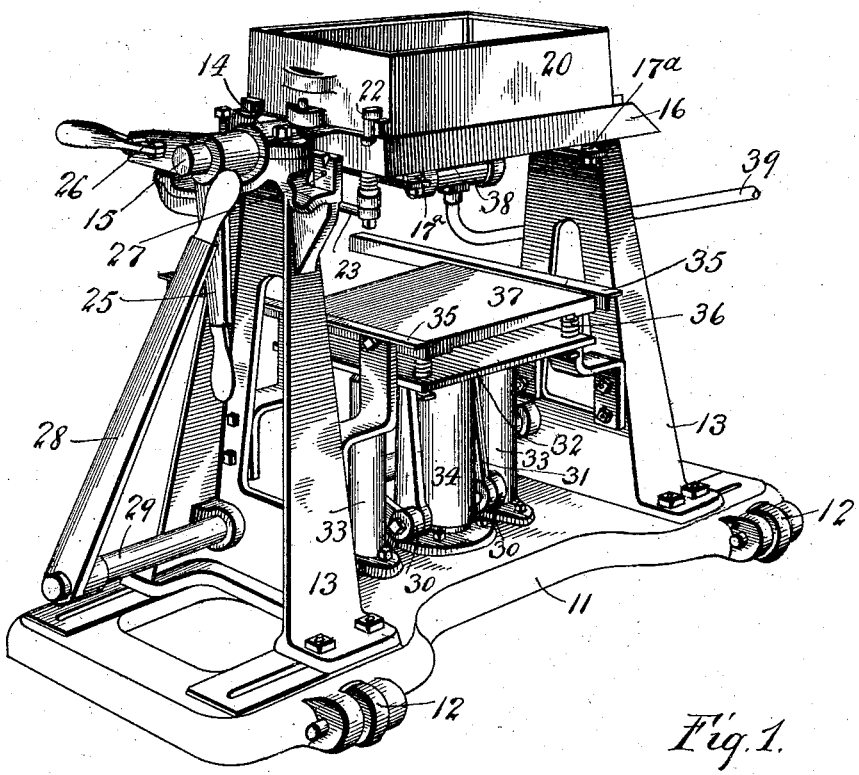
Figure 2:
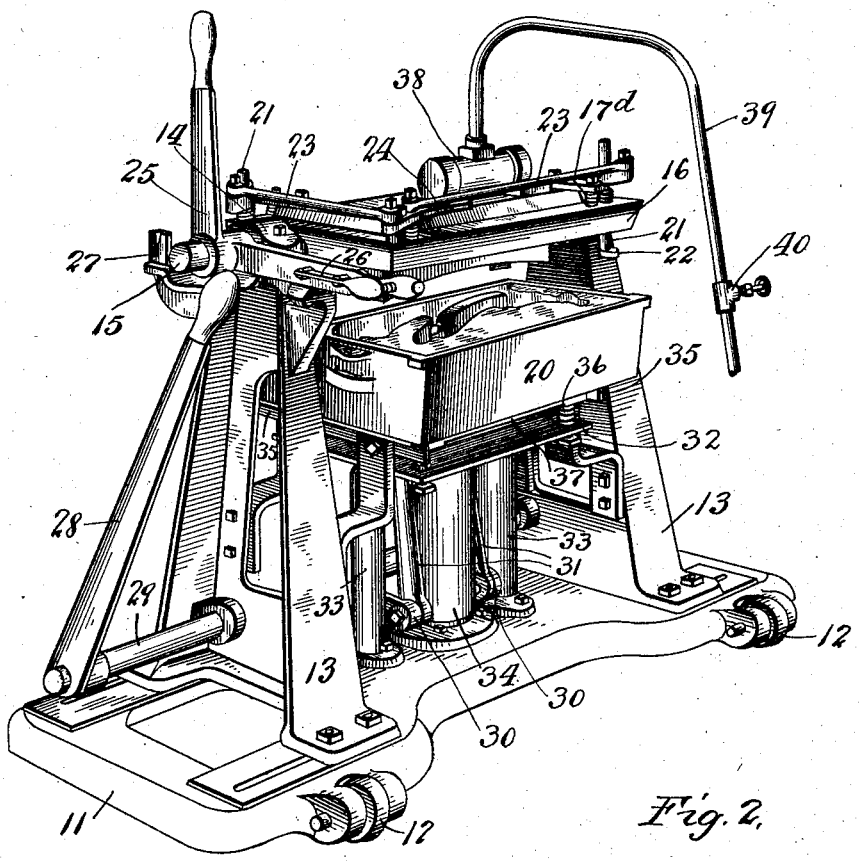
Figure 2 shows the machine with the flask inverted and lowered away from the pattern.
Figures 3, 4:
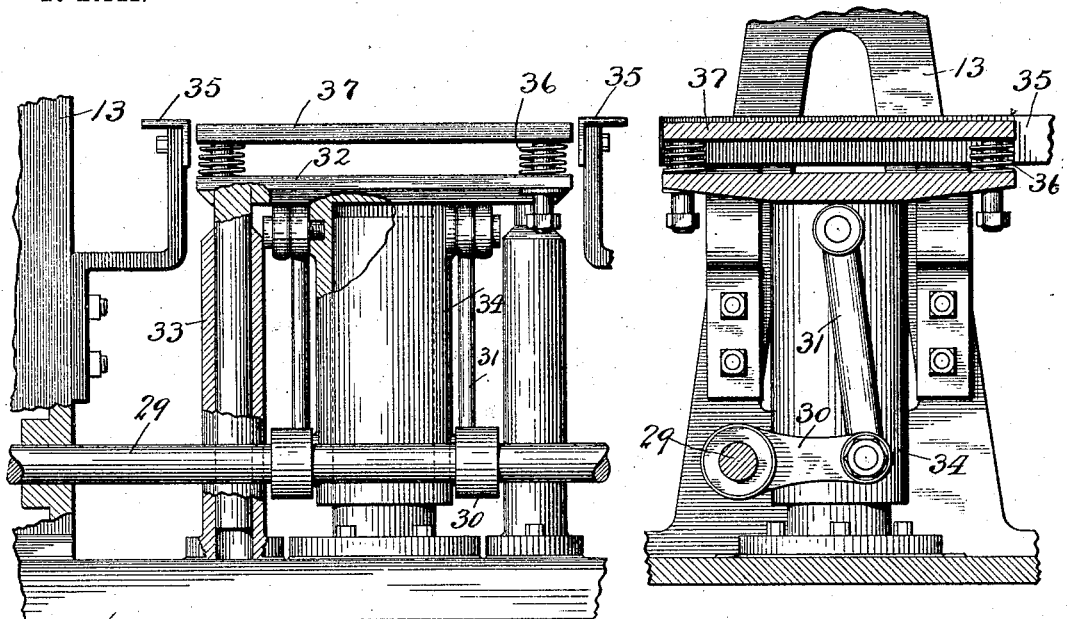
Figure 3 is a view, partly in section, showing the lowering mechanism.
Figure 4 is a side elevation, partly in section, of the same mechanism as is shown in Fig. 3.
Figure 5:
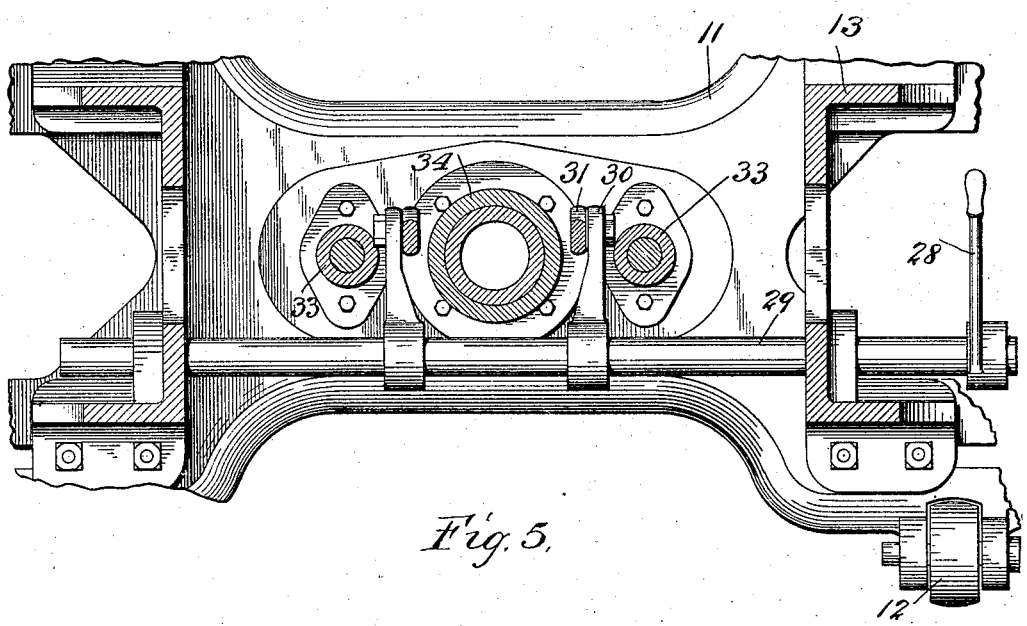
Figure 5 is a partial plan view, also partly in section, showing the details of the frame construction and bed-plate.
Figure 6:
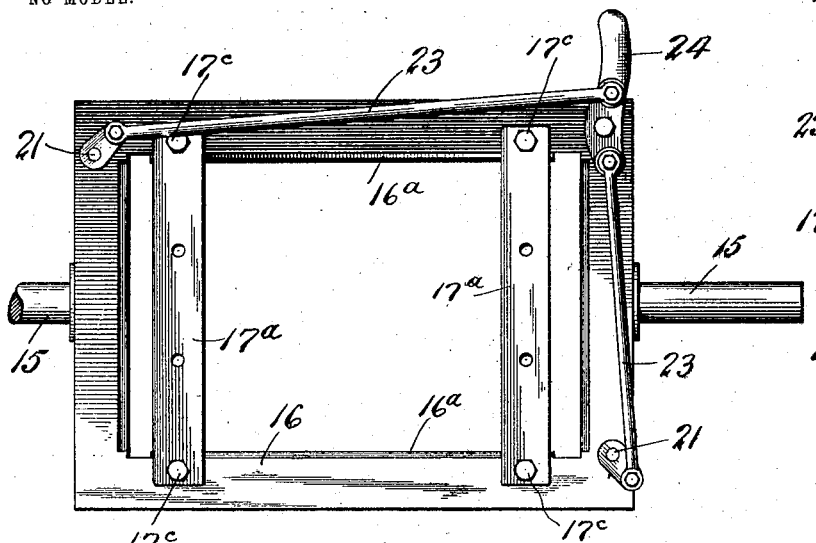
Figure 6 is a plan view of the match-frame which I employ.
Figure 7:
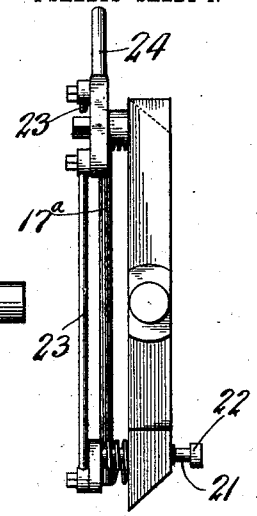
Figure 7 is an end elevation of the match-frame.
Figure 8:
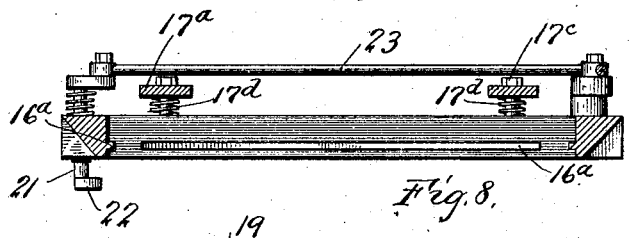
Figure 8 is a section through the match-frame.

Referring now more particularly to Figures 1 and 2, it will be seen that in carrying out my invention I provide first a machine frame having a bed plate 11 carried upon rollers 12 and supporting upon its upper surface a couple of brackets 13 and other devices between said brackets connected with the lowering mechanism which will be hereinafter more particularly described. At the upper ends of the brackets 13 are bearings 14 constructed to receive the supporting trunnions 15 of a match-frame 16, to which is secured a match-tray 17 which holds a match 18 in which is embedded a pattern 19, and also provided with a locking device for holding a flask 20 to the match-frame while the mold is being inverted, the said locking device comprising essentially a plurality of bolts 21 provided with eccentric heads 22, and connections 23 to an operating handle 24 by which the bolts 21 can be rotated or turned in unison when it is desired to lock or unlock the flask from the match-frame.

As a means for turning the match-frame, I provide the double-armed lever 25 having the spring latch 26 constructed to engage notches or catches 27 upon opposite sides of the upper end of one of the brackets 13, so as to secure or retain the mold and flask either in upright or in inverted position as may be desired.

As a means for lowering the mold away from the pattern, I provide a hand lever 28 attached to a shaft 29 which, through the cranks 30 and links 31, acts to raise and lower a table 32, the said table being guided by rods working in the upwardly extending cylindrical guide posts 33, and provided with a dash-pot or fluid pressure checking cylinder 34 to prevent damage to the mold in case it should be too suddenly lowered.

To the brackets 13 are attached a couple of rails 35 between which the table 32 is raised and lowered, and above the table 32 there is supported upon springs 36 a super-table or plate 37 upon which the mold is designed to rest while it is being lowered.

Figure 9:
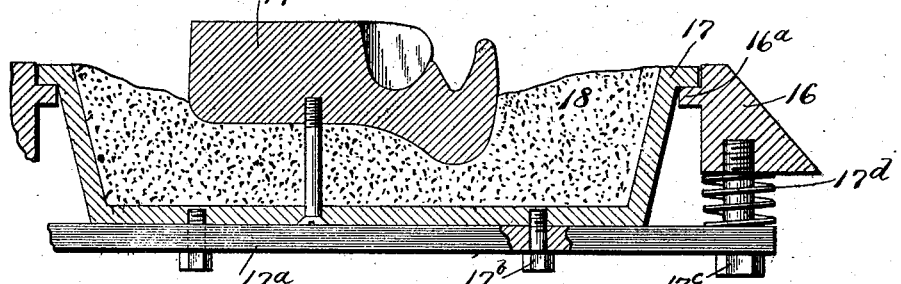
Figure 9 is a section on an enlarged scale showing the match-frame, a pattern, a match, and a match-tray secured in the match-frame.

The method of mounting the pattern, match, and match-tray within the match-frame 16 is clearly shown in Figure 9, in which the pattern 19, which may be of any suitable substance, as, for example, any common wooden pattern, is embedded in some plastic material such as plaster of paris 18 which afterward hardens in a manner well-known in the art, the match thus formed being held in a tray or dish 17 which rests upon the ledges 16ᵃ of the match-frame and is held in proper position by means of the strap irons 17ᵃ, the small screw-bolts 17ᵇ and the bolts 17ᶜ. Between the ends of the straps 17ᵃ and the match-frame 16 are inserted springs 17ᵈ adapted to permit the match-tray to be drawn a little away from the match-frame when the mold is lowered away from the pattern in case the pattern and mold have a tendency to stick together a little, thus permitting the rapping mechanism to produce effective operation against the pattern and preventing injury to the mold. The rapping mechanism 38 may be constructed after the manner of any of the usual well-known forms of pneumatic hammer device commonly employed for such purposes. It is attached to the match-tray 17 upon the under side thereof, the rapper 38 being clearly shown in place in both Figures 1 and 2. The inlet tubes 39, which must be flexible, through which the compressed air is admitted to operate the rapping device, are controlled by means of a valve of any preferred form 40.

The operation of my invention is as follows. The parts being in the position shown in Figure 1, sand is put into the flask 20 and properly rammed down either by machinery or by hand, the flask being held in position upon the match-frame 16 by means of the eccentric-head bolts 22 already described; after the mold has been rammed, the pressure upon the latch 26 releases the match-tray which can then, by the handle 25, be inverted or brought to the position shown in Figure 2. The lowering mechanism is now brought up against the under side of the mold by means of the lever 28, and the locking device which holds the flask to the match-frame, is released by movement of the lever 24. Just prior to the release of the flask, the power rapping device is started by opening the valve 40, and after the flask is unlocked the entire mold is lowered away from the pattern into the position clearly shown in Figure 2, the rapid agitation produced by the rapping device causing a vibratory movement, first of the match-tray, then of the match, and lastly of the pattern, and in consequence of such vibratory movement, permitting the mold to separate from the pattern without difficulty or damage. The mold is lowered until it rests upon the fixed rails 35 when it can be drawn out laterally and taken away while the machine is prepared for another mold by returning the parts to the position shown in Figure 1.

Having thus described my invention, what I claim as new, and desire to secure by Letters Patent, is—

1. A molding machine comprising an invertible match-frame, a match plate mounted in said frame, a power rapping device constructed to agitate the match plate and its pattern, and means for lowering the mold away from the pattern, substantially as described.

2. A molding machine comprising the combination of a pattern, a match frame, a match-tray, means for inverting said match-tray and pattern, means for lowering the mold away from the pattern, and a power rapping device attached to said match-tray, substantially as described.

3. A molding machine comprising the combination of a pattern, a match plate, a match-frame carried by trunnions, a bed-plate, brackets supported by said plate having bearings at their upper ends forming journals for said trunnions, a power rapping device constructed to agitate the match plate and its pattern, means for inverting said match-frame, and means for lowering the mold away from the pattern after it has been inverted, substantially as described.

4. A molding machine comprising the combination of a pattern, a match plate, a match-frame carried by trunnions, a bed-plate, brackets supported by said plate having bearings at their upper ends forming journals for said trunnions, means for inverting said match-frame, means for lowering the mold away from the pattern after it has been inverted, and a power rapping device for agitating the pattern as the mold is being stripped, substantially as described.

5. A molding machine comprising the combination of a pattern, a match plate, a match-frame carried by trunnions, a bed-plate, brackets supported by said plate having bearings at their upper ends forming journals for said trunnions, a power rapping device constructed to agitate the match plate and its pattern, means for inverting said match-frame and pattern, means for lowering the mold away from the pattern after it has been inverted, and a locking device for holding the flask in position upon said match-frame, substantially as described.

6. A molding machine comprising the combination of a pattern, a match, a match-frame carried by trunnions, a bed-plate, brackets supported by said plate having bearings at their upper ends forming journals for said trunnions, means for inverting said match-frame, means for lowering the mold away from the pattern after it has been inverted, and a locking device for holding the flask in position upon said match frame comprising eccentric-head bolts and means for operating said bolts in unison.

7. A molding machine having a reversible match plate comprising a match-frame, a tray carried by the frame, and spring mechanism whereby said tray is yieldingly held in position in said frame, substantially as described.

8. In a molding machine, the combination of an invertible match plate frame, a match plate attached therein so as to be firmly supported on the frame when in one position and being resiliently held thereto when in the inverted position.

9. In a molding machine an invertible flask in combination with a match plate having patterns fixed thereon, said plate being loosely suspended in one of its positions and provided with means for vibrating the said plate without disturbing the mold or the rest of the machine.

10. In a molding machine the combination of an invertible match frame, a match plate carrying patterns and spring-supported from said frame when in inverted position, and a rapping device mounted on said plate, whereby the plate and pattern may be vibrated without vibrating the frame.

11. In a molding machine the combination of a reciprocating receiving table, a reversible match plate frame, a match plate resting on the frame when in one position and spring-supported therefrom when in inverted position, and a flask attached to said plate, and mechanism for simultaneously releasing all the attaching means for said flask, to deposit it upon said table.

12. In a molding machine the combination of a match frame, means for inverting it, a match plate spring-supported from the frame when in inverted position and provided with rapping mechanism, and a flask removably attached to said frame.

13. In a molding machine the combination with an invertible match frame, a match plate spring-supported thereon, and patterns removably supported on said plate, substantially as described.

14. In a molding machine the combination of an invertible match frame, a match plate and flask supported thereon when the frame is right side up, and spring-supported from the frame when the frame is inverted, means independent of the frame for vibrating the match plate within the mold, and mechanism for releasing the flask from the match plate when the frame is inverted.

15. A molding machine provided with invertible means for supporting a flask on top of a pattern plate, means for resiliently supporting the flask when inverted, means for agitating the patterns within the flask and independently of the rest of the machine when the flask is inverted, and a vertically reciprocating table for receiving the flask.

FRANK W. HUDSON.

Witnesses:
PAUL SYNNESTVEDT,
PAUL CARPENTER.